United States Patent [19]
Mueller

[11] 3,808,543
[45] Apr. 30, 1974

[54] APPARATUS AND METHOD TO ACCOMPLISH TURBINE METER OUTPUT PULSE MULTIPLICATION

[75] Inventor: Allen Howard Mueller, Houston, Tex.

[73] Assignee: Daniel Industries, Inc., Houston, Tex.

[22] Filed: Oct. 24, 1972

[21] Appl. No.: 299,765

[52] U.S. Cl............... 328/38, 73/231, 307/220, 307/295, 328/20, 328/28, 324/173
[51] Int. Cl. ............................................. H03k 5/00
[58] Field of Search ...... 307/220, 225, 295; 328/20, 328/28, 38, 140; 324/173, 174, 70; 73/3, 73/229, 230, 231

[56] References Cited
UNITED STATES PATENTS

| | | | |
|---|---|---|---|
| 3,455,162 | 7/1969 | Michener et al. | 73/231 |
| 3,021,488 | 2/1962 | Edson | 328/28 |
| 3,350,637 | 10/1967 | Pochtar | 324/173 |
| 3,601,705 | 8/1971 | Germann et al. | 328/20 |

OTHER PUBLICATIONS
"Accurate Tachometry Methods with Electronic Counters", by Shulman in AIEE Transactions Part I, Vol. 73, Nov. 1954, pp. 452-455.

*Primary Examiner*—Stanley D. Miller, Jr.

[57] ABSTRACT

In one exemplar embodiment, a circuit to achieve turbine meter resolution multiplication is disclosed wherein the velocity waveform signal induced in the turbine meter sensing coil is converted to a voltage or constant amplitude waveform signal, the signal is then multiplied utilizing analog techniques and a series of square-wave pulses is generated representative of the multiplied frequency. Additional pulse generation circuitry is utilized to generate a pair of pulse series corresponding to the negative and positive going portions of the series of square-wave pulses, the two series of pulses are added and applied to a one-shot multivibrator to generate another series of pulses twice the frequency of the series of square-wave pulses and four times the frequency of the signal induced in the turbine meter coil.

14 Claims, 3 Drawing Figures

APPARATUS AND METHOD TO ACCOMPLISH TURBINE METER OUTPUT PULSE MULTIPLICATION

BACKGROUND OF THE INVENTION

This invention relates to turbine meters and more particularly to turbine meter output pulse resolution multipliers.

A.P.I. Code 2531, as a standard for positive displacement and turbine meter provers, mentions four important error sources which must be considered in the design of a meter prover system: repeatability of the run, resolution with which the turbine meter or positive displacement meter can be read, resolution of the switches which produce the gate signal (start and stop) at each end of the prover section and the velocity of the displacer. This invention relates to solving the second error source mentioned above, i.e., resolution with which the turbine meter can be read. Positive displacement meters typically have a relatively low inherent resolution and rely upon electromechanical pulse generators to produce an artificially high resolution for the proving run. Mechanical speed increasers can provide resolution up to 5000 pulses per barrel with 1000 or 2000 pulses per barrel being the more common output. However, considerable care is required to eliminate the effects of gear backlash, cycling, and meter loading.

Turbine meters, on the other hand, have a relatively high inherent resolution and in the smaller diameter turbine meters, 1000 pulses per barrel output is normal. In the larger turbines, inherent resolution may be as low as 100 or 200 pulses per barrel, although with conventional pick-up head designs, this may be raised to 300 to 600 pulses per barrel.

To minimize resolution error in the mter, A.P.I. Code 2531 requires the generation of a minimum of 10,000 meter pulses for a prover run. It can be seen that if a positive displacement meter with a mechanical pulse generator producing 1000 pulses per barrel is used, a 10-barrel prover will provide the desired 10,000 pulses. If, on the other hand, a turbine meter generating only 200 pulses per barrel is used, a prover producing 10,000 pulses would have to be 50 barrels in size. Accordingly, a need for a pulse resolution multiplier for turbine meters has long been felt.

The most conventional approach to solve this problem has been to utilize multiple sensing coils in the turbine meter spaced radially about the rim of the meter. Typically, each coil is connected to a separate input of a combining preamplifier, where fixed duration pulses are individually triggered by the coil signal, after which all such pulses are OR'd to form an output. The coils are angularly positioned (and polarized) such that pulses are anti-coincident, thereby producing an output resolution which is multiplied by the number of coils used. The multiple type pick-up coil system is particularly sensitive to angular tolerances in the placement of coils. This tolerance is prohibitively small in larger turbine meters, for example, a 25 percent variation in pulse spacing is introduced by a plus or minus 5.6 minute of arc tolerance in the annular position of the coils in a 20-inch turbine meter using a rim type rotor utilizing four coils to accomplish a 4X multiplication. Accordingly, a frequency multiplication using a system other than multiple coils is necessary, and applicant has devised an unusually direct, positive, fast and trouble-free method and apparatus for frequency multiplication using a single turbine meter coil. Also, the cost of the circuitry is approximately that of a single reluctance coil in a turbine meter.

SUMMARY OF THE INVENTION

The instant invention provides a novel frequency multiplying circuit for increasing the output frequency resolution of a turbine meter, comprising a turbine meter pick-up coil in which a velocity waveform signal having at least a first frequency is induced, an equalizing network means connected in parallel to the pick-up coil for receiving the velocity between signal having at least a first frequency and converting the velocity waveform signal to a relatively constant amplitude voltage waveform, analog multiplying means connected to the equalizing network means for receiving the signal having at least a first frequency and generating a signal having at least a second frequency which is a preselected multiple of the first frequency. If additional multiplication is desired, a square-wave pulse generating means is provided for receiving the signal of at least a second frequency and generating a first series of square-wave pulses representative of the second frequency signal, second pulse generating means for receiving the first series of square-wave pulses and generating a second series of pulses corresponding to the positive going portion of each pulse of said first series of pulses, third pulse generating means for receiving the first series of square-wave pulses and generating a third series of pulses corresponding to the negative going portion of each pulse of the first series of pulses, adding means for combining the second and third series of pulses to form a fourth series of pulses corresponding to the positive and negative going portions of each pulse of the first series of square-wave pulses and pulse forming means for receiving the fourth series of pulses and generating a fifth series of pulses in response thereto representative of a third frequency, the third frequency being double the second frequency and four times the velocity waveform signal.

Accordingly, one primary feature of the present invention is to provide apparatus and a method for turbine meter output frequency resolution multiplication utilizing a single reluctance sensing coil.

Another feature of the present invention is to provide turbine meter resolution multiplier having the capability of producing signals that are double and four times the frequency of the basic frequency induced in the reluctance sensing coil of the turbine meter and utilizing only a single sensing coil.

Yet another feature of the present invention is to provide a turbine meter resolution multiplier that can generate even multiples of the basic frequency induced in the reluctance sensing coil of the turbine meter.

Still another feature of the present invention is to provide a single coil high resolution multiplier in a turbine meter which eliminates the need for multiple coils and critical coil spacing in a turbine meter.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings:

FIGS. 3 to 3I are waveforms which occur at various points in the turbine meter resolution multiplier shown in FIG. 1.

DETAILED DESCRIPTION OF THE PREFERRED EMBODIMENTS

Figure 1:
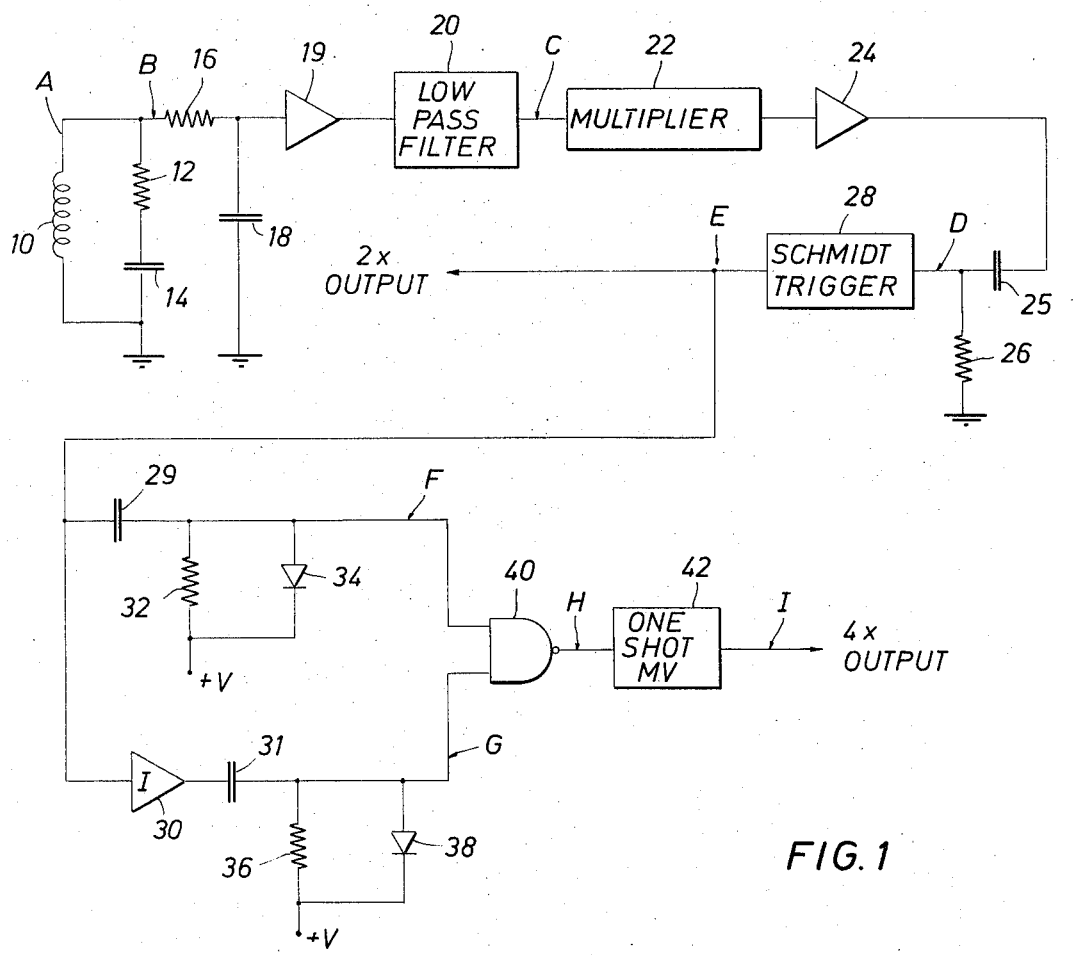
FIG. 1 is a schematic diagram of the turbine meter resolution multiplier.

Referring now to FIG. 1, coil 10 is the reluctance sensing coil of the turbine meter (not shown). An equalizing network comprising resistor 12 and capacitor 14 is connected in parallel across coil 10. The junction of coil 10 and capacitor 14 is at circuit ground potential. The junction of coil 10 and resistor 12 is connected in series to a resistor 16 with a capacitor 18 connected to the opposite side of resistor 16 to ground, in parallel with resistor 12 and capacitor 14. Resistor 16 and capacitor 18 comprise a first order low pass filter. A first order high pass filter 19 acting primarily as a gain or amplifier stage is connected in series with resistor 16. The output of the high pass filter or amplifier 19 is applied to a low pass filter 20, the output of which is applied to the input of a multiplier 22.

The multiplier 22 is a linear four-quadrant multiplier which may conveniently be a Fairchild 795C or a Motorola 1495L integrated circuit multiplier. The linear four-quadrant multiplier makes use of certain logarithmic characteristics of semiconductors to perform an analog multiplication of signals. When connected in the proper configuration, the circuit functions as a mathematical squaring circuit, the output being zero when the input is zero, and positive when the input is either positive or negative, and will perform a squaring function so that if the input is a first frequency, the output of the multiplier will be a frequency twice the input frequency.

The output of the four-quadrant multiplier is applied to an amplifier 24, and the amplified output is then applied to a first order high pass filter made up of capacitor 25 and resistor 26. The output of the RC network is applied as an input to a Schmidt trigger 28, and the output square-wave pulses of the Schmidt trigger are applied directly as an output representative of the frequency doubled by multiplier 22. The output signal of the Schmidt trigger is also applied as an input to a differentiating network comprising capacitor 29, resistor 32, and diode 34 to differentiate the negative going portion of each the Schmidt trigger output square-wave pulses, which are then applied as one input to NAND gate 40. The output of the Schmidt trigger is also applied as an input to an inverter 30, and the output of the inverter 30 is applied as an input to another differentiating network comprising capacitor 31, resistor 36, and diode 38 where the positive going portion of the Schmidt trigger output square-wave pulses are differentiated and applied as a second input to NAND gate 40. The output of NAND gate 40 is applied to a one-shot multivibrator 42 which generates a series of pulses in response to the pulses passed by NAND gate 40. The output of the one-shot multivibrator 42 is a pulse frequency double the output pulse frequency of the Schmidt trigger 28 and four times the input signal frequency induced in coil 10.

Figure 2:
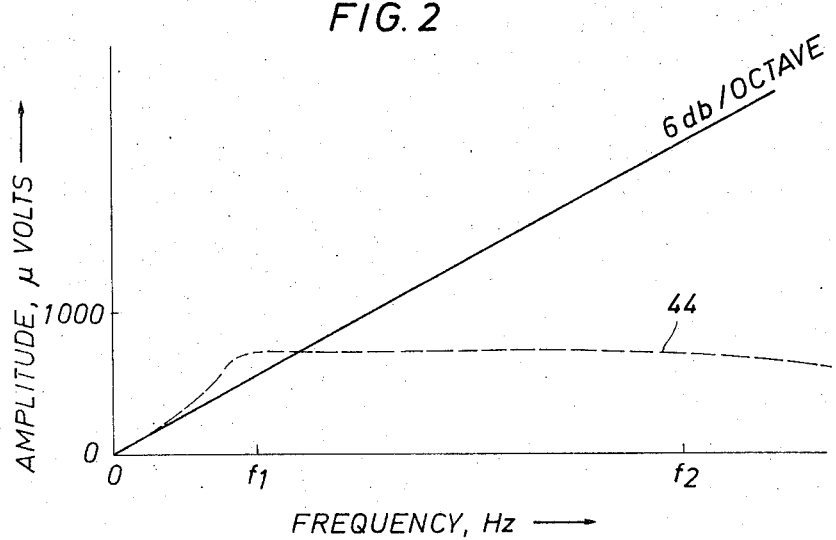
FIG. 2 is a graph showing frequency versus amplitude of the output of the turbine meter coil with equalizing network.
Figure 3:
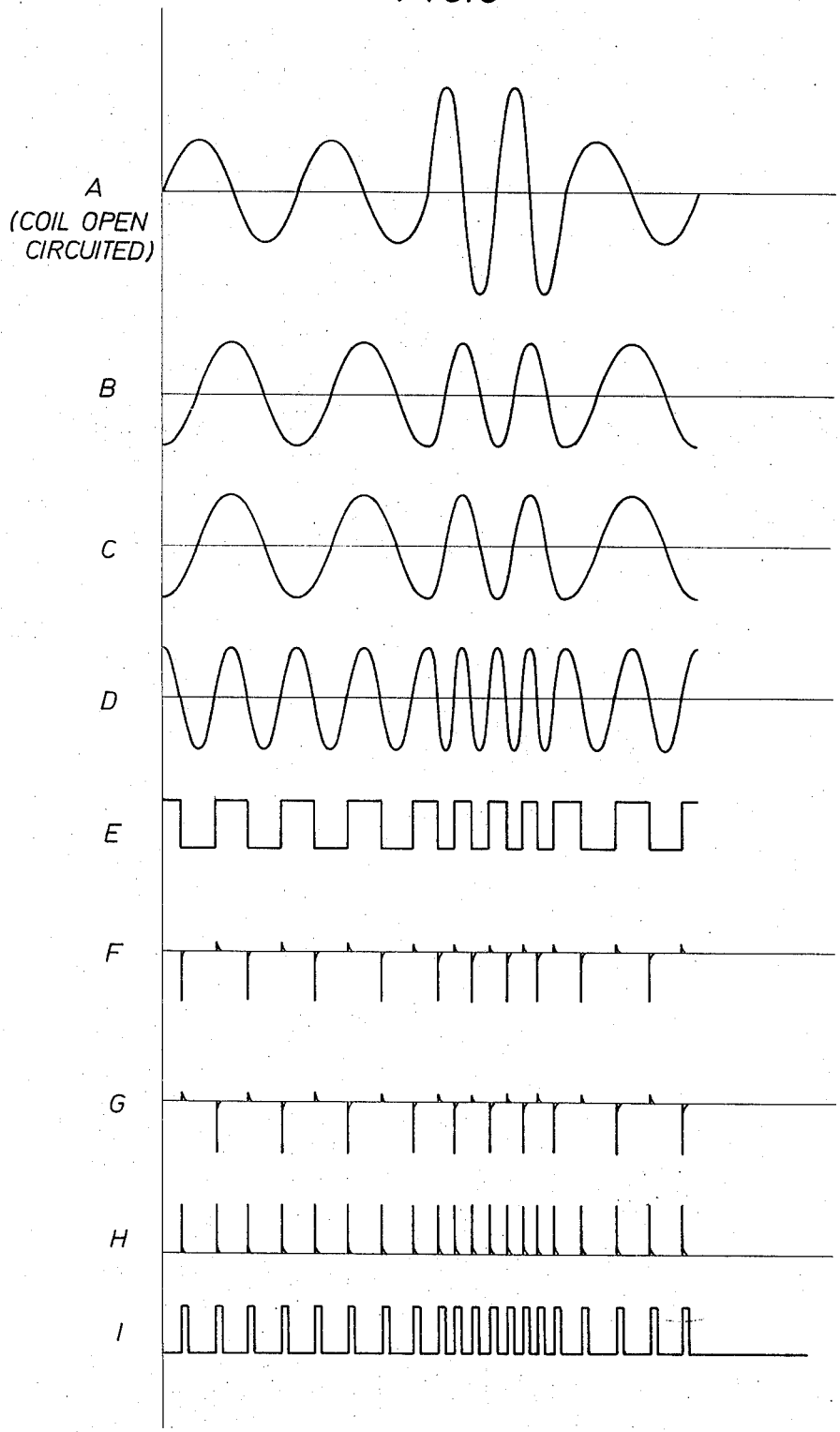

In operation, and referring now to FIGS. 1, 2 and 3, the input to the turbine meter resolution multiplier is the typical turbine meter variable reluctance sensing coil 10, the output voltage of which is proportional to the rate of change of flux generated by the turbine meter. In this manner, the amplitude of the open circuit output voltage waveform of this type sensor is directly proportional to the speed of the turbine, hence a velocity waveform. If coil 10 was open circuited while the signal was induced therein, the velocity waveform would be as seen at point A and illustrated in FIG. 3A. But a relatively constant amplitude voltage waveform is required for proper operation of the circuit, and accordingly, the velocity waveform is converted to a waveform proportional to the instantaneous displacement of the turbine, i.e., one which is constant in amplitude over the required turbine meter range, with the frequency remaining directly proportional to speed. This conversion is effectively accomplished by the coil equalizing network, comprising resistor 12 and capacitor 14 tied in parallel across coil 10. The converted constant amplitude waveform, as an output from the coil equalizing network, may be seen as taken at point B, the output of the coil equalizing network, and is shown graphically in FIG. 3B. FIG. 2 depicts frequency versus output amplitude of the velocity waveform over a desired turbine meter range between frequencies $f_1$ and $f_2$.

The displacement or constant amplitude waveform signal is applied to a first order low pass filter comprising resistor 16 and capacitor 18 and the output of the filter is applied directly to a first order high pass filter 19 which acts primarily as an amplifier or gain stage. The output of the high pass filter or gain stage 19 is applied to a third order low pass filter 20. Low pass filter 20 is designed to pass the highest turbine frequency without attenuation, and causes the system to be insensitive to sometimes troublesome high frequency electrical disturbances, thereby increasing its overall reliability of operation. The waveform at the output of the low pass filter 20 is taken at point C and is illustrated in FIG. 3C. It is not critical that the filters be of the order described in this embodiment, as filters of other orders may be utilized. In some applications, the filters may not be necessary and hence not even used.

The output of the low pass filter 20 is applied as an input to multiplier 22, a linear four-quadrant multiplier as hereinabove described. The multiplier 22 functions as a mathematical squaring circuit. If the input waveform at C to multiplier 22 is sinusoidal, the output waveform will be sinusoidal, having twice the frequency of the waveform at C. The output of multiplier 22 is applied to an amplifier 24 and the amplified signal is applied to a first order high pass filter comprising capacitor 25 and resistor 26 to eliminate the d-c component of the signal after squaring by the multiplier 22. The output from the filter network at point D corresponds to the waveform shown in FIG. 3D, which can be seen to be a frequency double the frequency shown in FIG. 3C as the input to multiplier 22. This signal may be utilized in its present form or a series of pulses generated to represent the multiplied or doubled frequency. If additional multiplication is desired then further processing of the frequency signal is necessary.

To further multiply the signal, the signal having waveform D is applied as an input to Schmidt trigger 28 which produces a series of square-wave pulses at point E and illustrated in FIG. 3E which is applied out as a signal representative of a frequency twice that of the input frequency. The pulse signal at waveform E is a symmetrical square wave throughout the operating range of the turbine meter, whose frequency is exactly twice that of the variable reluctance coil frequency of the turbine meter.

The output square-wave pulses of Schmidt trigger 28 are also applied as an input to a conventional inverter circuit 30 which inverts the Schmidt trigger pulses and applies the inverted pulses to a conventional differentiating network comprising capacitor 31, resistor 36, and diode 38 to produce a second series of pulses shown in FIG. 3G, corresponding to the positive going portions of the square wave shown in FIG. 3E. The G series of pulses are applied as an input to a conventional NAND gate 40. The output of the Schmidt trigger 28 is also applied as an input to a second differentiating network comprising capacitor 29, resistor 32, and diode 34. The output of differentiating network is taken at point F and is shown in FIG. 3F and is a third series of pulses corresponding to the negative going portion of each of the Schmidt trigger square wave pulses shown in FIG. 3E. The pulses shown at FIG. 3F are applied as a second input to NAND gate 40.

NAND gate 40 passes both the second and third series of pulses shown in FIGS. 3F and 3G, inverts the pulses and applies them as a train of pulses shown at point H (FIG. 3H) as an input to a one-shot multivibrator circuit 42. The signals shown as waveform H are a fourth series of pulses corresponding to the negative and positive going portions of waveform E shown in FIG. 3E. Each pulse of the waveform shown in FIG. 3H triggers the conventional one-shot multivibrator 42, producing a pulse of a fixed time duration. Accordingly, the output of the one-shot multivibrator 42 is a fifth series of pulses taken at point I, and shown in FIG. 3I, as a train of pulses, the positive going portion of each of which corresponds to each pulse in waveform H, each pulse having a fixed time duration. The duration of each pulse is designed to be as long as possible without appreciably exceeding the fifty-percent duty cycle of the highest turbine frequency. The output of the one-shot multivibrator 42 is a series of pulses whose frequency is exactly twice the frequency of the pulse series output of the Schmidt trigger 28, shown in FIG. 3E, and whose frequency is exactly four times that of the variable reluctance coil 10 frequency output of the turbine meter.

Of course, it may be seen that multiple multiplying circuits 22 may be cascaded to multiply the turbine frequency by two, four, eight, 16, etc., to achieve a greater analog multiplication of the sinusoidal wave prior to being multiplied by the pulse multiplying circuitry.

Numerous variations and modifications may obviously be made in the structure herein described without departing from the present invention. Accordingly, it should be thoroughly understood that the form of the invention herein described and shown in the figures of the accompanying drawings are illustrative only and are not intended to limit the scope of the invention.

What is claimed is:

1. A frequency multiplying circuit for increasing the output frequency resolution of a turbine meter, comprising a turbine meter pickup coil in which a velocity waveform signal having at least a first frequency is induced, one side of said coil being connected to ground potential, equalizing network means connected to the other side of said coil for receiving said velocity waveform signal having at least a first frequency and converting said signal to a relatively constant amplitude voltage waveform, filter means connected to said equalizing network means for receiving said relatively constant amplitude voltage waveform signal having at least a first frequency, amplifying said signal, and passing said signal between predetermined minimum and maximum frequencies, multiplying means connected to said filter means for receiving said signal having at least a first frequency and generating a signal having at least a second frequency which is a preselected multiple of said first frequency, a Schmidt trigger circuit for receiving said signal of at least a second frequency and generating a first series of square-wave pulses representative of said second frequency, a differentiating network for receiving said first series of pulses and generating a second series of pulses corresponding to the positive going portion of each square-wave pulse of said first series of pulses, an inverter for inverting said first series of pulses, a differentiating network for receiving said first series of pulses and generating a third series of pulses corresponding to the negative going portion of each square-wave pulse of said first series of pulses, combining means for combining said second and third series of pulses to form a fourth series of pulses corresponding to the positive and negative going portions of each pulse of said first series of pulses, and pulse forming means for receiving said fourth series of pulses and generating a fifth series of pulses in response thereto representative of a third frequency said third frequency being double said second frequency.

2. The circuit described in claim 1, wherein said combining means comprises a NAND gate for receiving said second and third series of pulses and passing both said series to form said fourth series of pulses.

3. The circuit described in claim 1, wherein said pulse forming means comprises a monostable multivibrator for receiving said fourth series of pulses and generating said fifth series of pulses.

4. A frequency multiplying circuit for increasing the output frequency resolution of a turbine meter, comprising a turbine meter pickup coil in which a velocity waveform signal having at least a first frequency is induced, one side of said coil being connected to ground potential, equalizing network means connected to the other side of said coil for receiving said velocity waveform signal having at least a first frequency and converting said signal to a relatively constant amplitude voltage waveform, a first order low pass filter series connected to said equalizing network means for receiving said relatively constant amplitude voltage waveform signal having at least a first frequency, a first order high pass filter series connected to said first order low pass filter and functioning principally as a gain stage for amplifying said signal, a third order low pass filter series connected to said first order high pass filter and passing said signal between predetermined minimum and maximum frequencies, multiplying means connected to said filter means for receiving said signal having at least a first frequency and generating a signal having at least a second frequency which is a preselected multiple of said first frequency, first pulse generating means for receiving said signal of at least a second frequency and generating a first series of square-wave pulses representative of said second frequency, second pulse generating means for receiving said first series of pulses and generating a second series of pulses corresponding to the positive going portion of each square-wave pulse of said first series of pulses, third pulse generating means for receiving said first series of pulses and generating a third series of pulses corresponding to the negative going portion of pulses corresponding to the negative going portion of each square-wave pulse of said first series of pulses, combining means for combining said second and third series of pulses to form a fourth series of pulses corresponding to the positive and negative going portions of each pulse of said first series of pulses, and pulse forming means for receiving said fourth series of pulses and generating a fifth series of pulses in response thereto representative of a third frequency, said third frequency being double said second frequency, 5. The circuit described in claim 4, wherein said third order low pass filter is a Butterworth filter stage.

6. A frequency multiplying circuit for increasing the output frequency resolution of a turbine meter, comprising a turbine meter pickup coil in which a velocity waveform signal having at least a first frequency is induced, one side of said coil being connected to ground potential, equalizing network means connected to the other side of said coil for receiving said velocity waveform signal having at least a first frequency and converting said signal to a relatively constant amplitude voltage waveform signal, a first order low pass filter series connected to said equalizing network means for receiving said relatively constant amplitude voltage waveform signal having at least a first frequency, a first order high pass filter series connected to said first order low pass filter and functioning principally as a gain stage for amplifying said signal, a third order low pass filter series connected to said first order high pass filter and passing said signal between predetermined minimum and maximum frequencies, and multiplying means connected to said equalizing network means for receiving said signal having at least a first frequency and generating a signal having at least a second frequency which is a preselected multiple of said first frequency.

7. The circuit described in claim 6, including first pulse generating means for receiving said signal of at least a second frequency and generating a first series of square-wave pulses representative of said second frequency, and second pulse generating means for receiving said first series of pulses and generating a second series of pulses in response thereto representative of a third frequency, said third frequency being a predetermined multiple of said second frequency.

8. The circuit described in claim 7, wherein said second pulse generating means comprises third pulse generating means for receiving said first series of pulses and generating a third series of pulses corresponding to the positive going portion of each square-wave pulse of said first series of pulses, fourth pulse generating means for receiving said first series of pulses and generating a fourth series of pulses corresponding to the negative going portion of each square-wave pulse of said first series of pulses, combining means for combining said third and fourth series of pulses to form a fifth series of pulses corresponding to the positive and negative going portions of each pulse of said first series of square-wave pulses, and pulse forming means for receiving said fifth series of pulses and generating said second series of pulses in response thereto.

9. The circuit described in claim 7, wherein said first pulse generating means comprises a Schmidt trigger circuit to generate said first series of square-wave pulses representative of said signal of at least a second frequency.

10. The circuit described in claim 8, wherein said third pulse generating means comprises a differentiating network that generates said third series of pulses corresponding to the positive going portion of each of said square-wave pulses of said first series of pulses.

11. The circuit described in claim 8, wherein said fourth pulse generating means comprises an inverter for inverting said first series of pulses, and a differentiating network that generates said fourth series of pulses corresponding to the negative going portion of each of said square-wave pulses of said first series of pulses.

12. The circuit described in claim 8, wherein said combining means comprises a NAND gate for receiving said third and fourth series of pulses and passing both said series to form said fifth series of pulses.

13. The circuit described in claim 8, wherein said pulse forming means comprises a monostable multivibrator for receiving said fifth series of pulses and generating said second series of pulses.

14. A method of frequency multiplication for increasing the output frequency resolution of a turbine meter, comprising the steps of generating a velocity waveform signal having at least a first frequency, converting said velocity waveform signal to a relatively constant amplitude voltage waveform, multiplying said constant amplitude voltage waveform by a preselected multiple to achieve a second frequency, generating a first series of square-wave pulses representative of said second frequency, generating a second series of pulses corresponding to the positive going portion of each square-wave pulse of said first series of pulses, generating a third series of pulses corresponding to the negative going portion of each square-wave pulse of said first series of pulses, adding said second and third series of pulses to form a fourth series of pulses corresponding to the positive and negative going portions of each pulse of said first series of pulses, and generating a fifth series of pulses in response to said fourth series representative of a third frequency, said third frequency being double said second frequency.

* * * * *

PO-1050
(5/69)

UNITED STATES PATENT OFFICE
CERTIFICATE OF CORRECTION

Patent No. 3,808,543   Dated   April 30, 1974

Inventor(s)   Allen Howard Mueller

It is certified that error appears in the above-identified patent and that said Letters Patent are hereby corrected as shown below:

Col. 2, line 13, "between" should read --waveform--.

Col. 3, line 13, "Figs. 3 to 31 are" should read
--Fig. 3 is a graph of--.

Signed and sealed this 24th day of June 1975.

(SEAL)
Attest:

RUTH C. MASON
Attesting Officer

C. MARSHALL DANN
Commissioner of Patents
and Trademarks